United States Patent [19]

Nakajima et al.

[11] Patent Number: 5,587,132
[45] Date of Patent: Dec. 24, 1996

[54] METHOD FOR PRODUCING HIGH PURITY VANADIUM ELECTROLYTIC SOLUTION

[75] Inventors: Masato Nakajima; Toshiaki Akahoshi; Masatoshi Sawahata; Yutaka Nomura; Kanji Sato, all of Kashima-gun, Japan

[73] Assignee: Kashima-Kita Electric Power Corporation, Ibaraki-ken, Japan

[21] Appl. No.: 554,570

[22] Filed: Nov. 6, 1995

[30] Foreign Application Priority Data

Nov. 17, 1994 [JP] Japan .................................. 6-283694

[51] Int. Cl.$^6$ .............................. C01G 31/00; H01B 1/00
[52] U.S. Cl. ......................... 423/62; 423/68; 252/512; 252/62.2; 252/500
[58] Field of Search ................. 423/62, 68; 252/500, 252/512, 62.2; 429/188, 19; 205/538, 564

[56] References Cited

U.S. PATENT DOCUMENTS

| | | | |
|---|---|---|---|
| 4,645,651 | 2/1987 | Hähn et al. | 423/62 |
| 4,786,567 | 11/1988 | Skyllas-Kazacos et al. | 429/19 |
| 4,814,150 | 3/1989 | Corigliano et al. | 423/67 |
| 5,250,158 | 10/1993 | Kaneko et al. | |
| 5,318,865 | 6/1994 | Kaneko et al. | |
| 5,368,762 | 11/1994 | Sato et al. | |

FOREIGN PATENT DOCUMENTS

| | | |
|---|---|---|
| 0566019 | 10/1993 | European Pat. Off. |
| 1070154 | 12/1959 | Germany . |
| 4134109 | 4/1992 | Germany . |
| WO89/05363 | 6/1989 | WIPO . |

OTHER PUBLICATIONS

Patent Abstracts of Japan, vol. 18, No. 102 (E–1511), Feb. 18, 1994, and Derwent Abstracts, AN–92–292723 [36], JP–A–05–303973, Nov. 16, 1993.

*Primary Examiner*—Donald R. Valentine
*Attorney, Agent, or Firm*—Oblon, Spivak, McClelland, Maier & Neustadt, P.C.

[57] ABSTRACT

A method for producing an electrolytic solution containing vanadium as positive and negative electrode active material, the electrolytic solutions being suitable for a redox battery which comprises: the steps of (1) a vanadium compound is dissolved in a solvent under an alkaline or neutral condition, a polyvanadate compound is precipitated and isolated by thermal polymerization of vanadium ions under an acidic condition; (2) a part of the polyvanadate compound is baked in an inert or oxidizing gas atmosphere so as to remove ammonium ions; (3) a trivalent vanadium compound is formed by treating another part of the polyvanadate compound under a reductive atmosphere; (4) a trivalent vanadium electrolytic solution is formed by dissolving the trivalent vanadium compound in an acid solution; and (5) vanadium pentoxide and a part of the trivalent vanadium compound are reacted by mixing so that mixed electrolytic solutions of $V^{4+}$ and $V^{3+}$ are formed. According to the present invention, a high purity vanadium electrolytic solution can be economically produced even from vanadium pentoxide and ammonium metavanadate raw materials containing large quantities of impurities.

12 Claims, No Drawings

METHOD FOR PRODUCING HIGH PURITY VANADIUM ELECTROLYTIC SOLUTION

BACKGROUND OF THE INVENTION

1. Field of the Invention

The present invention relates to a method for producing an electrolytic solution suitable for a redox battery, in particular, high purity trivalent vanadium, tetravalent vanadium and/or mixture of trivalent and tetravalent vanadium electrolytic solution.

2. Description of the Related Art

In recent years, global environmental pollution such as acid rain, the destruction of the ozone layer by fluorocarbons, and the greenhouse effect due to an increase in carbon dioxide in the atmosphere are being focussed upon as a problems for all mankind. In the midst of this state of affairs, the movement to make the fullest possible use of solar energy, an inexhaustible and clean form of energy that is friendly towards the earth, has increased considerably. Examples of this include solar batteries, power generation making use of solar heat or heat reclamation, wind-turbine generation, and wave power generation (power generation making use of the energy of ocean currents, or temperature differences of seawater).

Of all of these, it is solar batteries, with a remarkable revolution in technology, that show signs of heading towards the time when they are ready for genuine practical applications, through improvements in their efficiency and a significant lowering in price. Currently, use of solar batteries is restricted to rather small-scale applications such as in powering road signs and communications relays, but rapid developments are also expected through envisioned solar energy cities and the implementation of designs to lay fields of batteries in the oceans or deserts. However, the power output of all of these power generation methods making use of solar energy is affected by climatic conditions, thus making stable and trustworthy production of electrical power impossible. Coordinated use of solar energy and reliable, effective batteries are required, and the realization thereof has been long awaited.

Moreover, electrical power may be easily converted into other types of energy, is easy to control, and causes no environmental pollution at the time of its consumption, and it is for these reasons that the percentage of total consumption taken up by electrical power is increasing every year. The distinguishing characteristic of electrical power is that its production and consumption are simultaneous with each other, and that it cannot be stored. It is for this reason that, at present, highly efficient nuclear power generation and advanced thermal power generation are being operated at the highest possible efficiency ratings, and that the large increase in demand for electricity during daylight hours is being met by small-scale thermal and hydropower generation suitable for generating power in response to fluctuations in consumption of electrical power. Thus, the current state of affairs is such that excess energy is being produced at night. The power generation world is earnestly hoping for development of technology that will make it possible to store this excess energy at night and use it efficiently during the day.

From circumstances such as those above, all types of secondary batteries have been studied as a method of storing electrical energy which does not pollute the environment and as an energy with a wide variety of applications. Redox batteries have received special attention as a high-volume stationary battery capable of operating at room temperature and atmospheric pressure. Redox batteries pass electrically active materials of positive and negative solution to the cells with flow-through electrodes, and are charged and discharged through a redox reaction. They thus have a comparatively longer life than normal secondary batteries, with minimized self-discharging, possess the advantages of being high in both reliability and safety and in having freely changeable electric capacity due to the separation of battery cells performing oxidation-reduction reaction and reservoirs storing electricity. Vanadium redox flow batteries using vanadium as both positive and negative electrodes have especially high output and readily recover even though there is a mixing of positive and negative electrolytic solutions through ion exchange membrane. Accordingly, the area of putting such batteries into the practical use has received the most attention in recent years.

A vanadium redox flow battery with tetravalent and pentavalent vanadium ion pairs as the positive electrode and trivalent and divalent vanadium ion pairs as the negative electrode was proposed by Professor M. Skylass-Kazacos of New South Wales University in Australia (Japanese Patent Laid-Open No. 62-186473, E. SUM "Journal of Power Sources", 15(1985), 179–190 and 16(1985), 85–95). This battery has a high output voltage of 1.4 V to 1.5 V, and is characterized by its high efficiency and high energy density, but as expensive vanadium must be used this has been viewed as being poorly suited for practical use.

In order to solve the above problems, the present inventors have proposed in Japanese Patent Laid-Open Nos. 4-149965 and 5-303973 a method for producing at low cost a vanadium electrolytic solution by reducing, in the presence of an inorganic acid, the vanadium compound recovered from the ash produced by combustion of heavy oil fuels, and a method in which a trivalent vanadium electrolytic solution and a tetravalent vanadium electrolytic solution are simultaneously prepared by reduction with sulfur in a sulfuric acid solution.

A redox battery comprises end plates; positive and negative carbon cloth electrodes provided between the end plates; and a separating membrane which is made of an ion exchange membrane and placed between the positive and negative carbon cloth electrodes. The tetravalent vanadium electrolytic solution for the positive electrode and the trivalent vanadium electrolytic solution for the negative electrode are supplied to the respective electrodes from respective tanks. In charging the redox battery, tetravalent vanadiums are gradually oxidized to become pentavalent vanadiums at the positive electrode and trivalent vanadiums are gradually reduced to become divalent vanadiums at the negative electrode. Discharge will be started at the time that tetravalent and trivalent vanadiums change to pentavalent and divalent vanadiums at the positive and negative electrodes, respectively. The electrolytic solutions for the positive and negative electrodes may be mixtures equivalently containing the tetravalent vanadium and trivalent vanadium; for example, tetravalent vanadium:trivalent vanadium may be 1:1 in both electrolytic solutions for the positive and negative electrodes; or tetravalent vanadium:trivalent vanadium may be 2:1 and 1:2 in the electrolytic solutions for the positive electrode and negative electrode, respectively. Therefore, there is a need for a method in which an electrolytic solution containing trivalent vanadiums is more economically produced than with electrolytic reduction.

The deterioration of the ion exchange membrane is one of the important subjects to solve in the industrialization of vanadium redox flow batteries. The present inventors have proposed, in Japanese Patent Laid-Open No. 4-4043, polysulfone and fluorocarbon resin ion exchange membranes having oxidation durability against pentavalent vanadium electrolytic solution and low membrane resistance, and enable high current density vanadium battery production. However, it has been revealed that the durability of the ion exchange membrane depends on not only the material itself but also on impurities in the electrolytic solution, especially alkaline earth metals and silicon compounds.

On the other hand, raw materials for high purity vanadium is expensive and it is difficult to obtain the required quantity. Therefore, the industrialization of vanadium redox flow batteries essentially requires a method for producing vanadium electrolytic solution by continuous purification and reduction of low purity vanadium raw materials that are inexpensive and abundant.

Purification of vanadium compounds is generally carried out by converting vanadium compounds to ammonium metavanadate, dissolving this into hot water, filtrating, and then crystallizing. However, in order to obtain high purity ammonium metavanadate, the crystallizing process must be repeated many times, which is industrially impractical. Another purification process, in which vanadium oxychloride is produced from raw vanadium compounds and distilled, is also not economical due to the complicated process involved. In particular, in the case of using low purity vanadium compounds recovered from the ash produced by combustion of heavy oil fuels as raw materials for the electrolytic solution, it is difficult to remove Si, no method for producing a high purity vanadium electrolytic solution with effective purification and reduction has been proposed and therefore, the development of a method for producing high purity vanadium electrolytic solution is a subject of great urgency for the industrialization of vanadium redox flow batteries.

SUMMARY OF THE INVENTION

The present invention is intended to substantially eliminate the above-described problems. Accordingly, an object of the present invention is to provide a method, which economically produces high purity vanadium electrolytic solutions not affecting the deterioration of the ion exchange membrane, comprising the combined process of purification and reduction using vanadium pentoxide and ammonium metavanadate as raw materials containing large quantities of impurities.

To achieve the above objects, the present invention provides a method for producing an electrolytic solution containing vanadium as positive and negative electrode active materials, the electrolytic solutions being suitable for a redox battery, the method comprising:

(1) a purification step in which a vanadium compound containing impurities selected from the group of vanadium pentoxide and ammonium metavanadate is dissolved in a solvent under an alkaline or neutral condition, a polyvanadate compound is precipitated by thermal polymerization of vanadium ions under an acidic condition, and the polyvanadate compound is isolated from the solution containing impurities;

(2) a de-ammoniation step in which a part of the polyvanadate compound prepared in the purification step is baked at a temperature range of 400° to 690° C. in an inert or oxidizing gas atmosphere so as to remove ammonium ions;

(3) a trivalent vanadium compound forming step in which a trivalent vanadium compound is formed by treating another part of the polyvanadate compound prepared in the purification step under a reductive atmosphere;

(4) a $V^{3+}$ electrolytic solution forming step in which a trivalent vanadium electrolytic solution is formed by dissolving the trivalent vanadium compound in an acid solution; and (5) a $V^{4+}/V^{3+}$ mixed electrolytic solution forming step in which vanadium pentoxide obtained in the de-ammoniation step and a part of the trivalent vanadium compound obtained in the $V^{+3}$ electrolytic solution forming step are reacted by mixing so that mixed electrolytic solutions having various mixing ratios of $V^{4+}$ to $V^{3+}$ are formed. According to the method, trivalent vanadium electrolytic solutions and trivalent vanadium and tetravalent vanadium mixed electrolytic solutions can be easily obtained.

Another embodiment of the present invention provides a method for producing an electrolytic solution containing vanadium as positive and negative electrode active materials, the electrolytic solutions being suitable for a redox battery, the method comprising:

(1) a purification step in which a vanadium compound containing impurities selected from the group of vanadium pentoxide and ammonium metavanadate is dissolved in a solvent under an alkaline or neutral condition, a polyvanadate compound is precipitated by thermal polymerization of vanadium ions under an acidic condition, and the polyvanadate compound is isolated from the solution containing impurities;

(2) a de-ammoniation step in which a part of the polyvanadate compound prepared in the purification step is baked at a temperature range of 400° to 690° C. in an inert or oxidizing gas atmosphere so as to remove ammonium ions;

(3) a tetravalent vanadium compound forming step in which a tetravalent vanadium compound is formed by suspending vanadium pentoxide formed in the de-ammoniation step and by heating with a reductant;

(4) a trivalent vanadium compound forming step in which a trivalent vanadium compound is formed by treating another part of the polyvanadate compound prepared in the purification step under a reductive atmosphere; and (5) a $V^{3+}$ electrolytic solution forming step in which a tetravalent vanadium electrolytic solution is formed by dissolving the tetravalent vanadium compound into an acid solution. According to this method, trivalent vanadium electrolytic solutions and tetravalent vanadium electrolytic solutions can be obtained.

According to a further embodiment of the present invention, trivalent vanadium electrolytic solutions, tetravalent vanadium electrolytic solutions, and trivalent vanadium and tetravalent vanadium mixed electrolytic solutions can be produced by adding (6) a $V^{4+}/V^{3+}$ mixed electrolytic solution forming step in which vanadium pentoxide obtained in the de-ammoniation step and the trivalent vanadium compound obtained in the $V^{3+}$ electrolytic solution forming step are reacted by mixing so that mixed electrolytic solutions having various mixing ratios of $V^{4+}$ to $V^{3+}$ are formed, to the above-described (1) through (5) steps according to demand.

DESCRIPTION OF THE PREFERRED EMBODIMENTS

Examples of the vanadium compound used as a starting material in the method of the present invention are vanadium pentoxide and ammonium metavanadate containing impurities. Examples of the major impurities are Si, Na, K, Ca, Mg, Fe and the like. Vanadium pentoxide selected as a starting material is previously dissolved into an ammonia solution to convert to ammonium metavanadate according to the following reaction before the purification step:

$$V_2O_5 + 2NH_3 + H_2O = 2NH_4VO_3$$

Next, each step will be explained in detail below.

(1) Purification step:

A predetermined quantity of ammonium metavanadate is completely dissolved into a solvent, commonly water, under an alkaline or neutral condition at a temperature range of 60° to 100° C. If silicon compounds such as sodium silicate ($Na_2SiO_3$) are contained as impurities, the quantity of dissolved material is desirably adjusted so that the ion concentration of the silicon compounds becomes 1,000 ppm or less, preferably 500 ppm or less in the solution. An ion concentration of over 1,000 ppm causes gelation and precipitation of the silicon compounds which are unsatisfactorily mixed in the polyvanadate compound.

After confirming complete dissolution of the ammonium metavanadate, the solution is heated to a temperature of 60° C. to 100° C. at the acidic condition of a pH of 1 to 3, preferably approximately 1.8, by adding sulfuric acid, for example, so as to polymerize vanadium ions. Although a reddish brown polyvanadate compound will rapidly precipitate, it is desirable to stir well for completing the reaction.

After the reaction, the vanadium compound is recovered by filtration with heating using a filter having a pore size of 1 to 0.45 μm from the precipitant including the polyvanadate compound. As most impurities remain in the filtrate, the obtained precipitant comprises a high purity vanadium compound no containing almost impurities other than ammonium ions.

It is said that the polymerization reaction of the vanadium ions will proceed as follows:

$$2nNH_4VO_3 + nH_2SO_4 = H(VO_3)_{2n}\downarrow + n(NH_4)_2SO_4$$

As $H(VO_3)_{2n}$ can be expressed as $nH_2O \cdot V_2O_5$ and hydrated vanadium pentoxide is synthesized by the wet process, the hydrated compound must contain no ammonium ions. However, it can be seen from the analysis of the obtained precipitant that the hydrate compound contains approximately 3 to 5% ammonium ions. It is thought that the following side reaction will also occur besides the above reaction:

$$10nNH_4VO_3 + 4H_2SO_4 = (NH_4)_2(V_{10}O_{26})\downarrow + 4(NH_4)_2SO_4 + 4H_2O$$

When polymerizing ammonium metavanadate under an acidic condition, metallic impurities can be dissolved in the solution, so they will not be included in the polyvanadate precipitant. In general, soluble silicates, for example $(SiO_3)_2^-$ and the like, will gel under an acidic condition by the following reaction:

$$NaSiO_3 + H_2SO_4 = H_2SiO_3\downarrow + Na_2SO_4$$

However, the inventors of the present invention found that the gelation can be prevented by reducing the concentration of the soluble silicate compounds to 1,000 ppm or less, preferably 500 ppm or less. In such a way, the silicate compounds can remain in the filtrate and be completely isolated from the polyvanadate precipitant so that a high purity vanadium compound can be produced.

(2) De-ammoniation step:

This step is essential for the production of a high purity tetravalent vanadium electrolytic solution. Impurities such as metallic and silicate compounds are satisfactorily removed from the polyvanadate compound obtained from the above purification step, but approximately 5% of the ammonium ions still remain in the polyvanadate compound. Because the ammonium ions cause the precipitation of vanadium in the electrolytic solution, the polyvanadate compound cannot be used as a raw material unless the ammonium ions are removed. Therefore, removing the ammonium ions is required for the preparation of a high purity tetravalent vanadium electrolytic solution.

The ammonium ions can be removed from the polyvanadate compound by heating the compound at 400° to 690° C. for 1 to 4 hours under an atmosphere of inert gas (usually nitrogen gas) or oxidizing gas (usually air). Temperatures less than 400° C. require longer times for the ammonium ion removal, while in the case of temperature greater than 690° C. the surface of the polyvanadate compound will melt and unsatisfactorily adhere to the apparatus. The de-ammoniation under the inert or oxidizing gas atmosphere proceeds as follows:

$$(NH_4)_2(V_{10}O_{26}) = 5V_2O_5 + 2NH_3\uparrow + H_2O$$

Because the de-ammoniation under an inert gas atmosphere causes partial reduction of $V_2O_5$ by ammonia, the oxidizing gas is desirable for obtaining $V_2O_5$. The de-ammoniation can be achieved by using a tunnel furnace, a rotary kiln, an electric furnace with trays and the like.

(3) Tetravalent vanadium ($V^{4+}$) electrolytic solution formation step:

The vanadium compound in which ammonium ions are removed by the above step is suspended in an acidic solvent such as an aqueous sulfuric acid solution, and reduced at a temperature from room temperature to 180° C. so that $V^{4+}$ electrolytic solution can be prepared. The reduction generally can be achieved at atmospheric pressure or elevated pressures.

The reduction of the trivalent vanadium to the tetravalent vanadium may be carried out with inorganic reductants such as hydrogen gas, sulfur dioxide gas, sulfur, hydrogen sulfide and the like, or organic reductants such as organic acids, alcohols, saccharide and the like. Among the organic reductants, oxalic acid is preferable, because the reduction of the vanadium compound proceeds so that the formed carbon dioxide gas will be released out of the system and organic impurities do not remain in the electrolytic solution as follows:

$$V_2O_5 + (COOH)_2 + 2H_2SO_4 = 2VOSO_4 + 2CO_2 + 3H_2O$$

(4) Trivalent vanadium compound forming step:

There are some methods for obtaining the trivalent vanadium compound, for example, electrolytic reduction and reduction by sulfur proposed by the inventors of the present invention (Japanese Patent Laid-Open No. 5-303973). However, these reduction methods can not remove ammonium ions contained in the $V_2O_5 \cdot H_2O$ synthesized in the purification step. The ammonium ions in the electrolytic solution will cause unsatisfactory vanadium precipitation. As another method, R. B. Heslop and P. L. Rovinson disclosed the reduction of tetravalent vanadium in "Inorganic Chemistry" (Maruzen Asian Edition (1965)) as shown in the following equation:

$$V_2O_5 \xrightarrow{H_2 \text{ (heat)}} V_2O_3 + 2H_2O$$

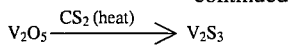

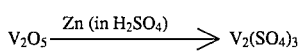

Considering that vanadium electrolytic solution will be produced on an industrial scale, the most suitable of these methods is the reduction by hydrogen which forms no pollution causing material and contains no undesirable metallic compound in the electrolytic solution. The reduction of the trivalent vanadium compound by hydrogen proceeds as follows:

$$V_2O_5+2H_2 V_2O_3+2H_2O$$

Although the vanadium compound obtained by the purification step contains water and ammonia, these can be removed in the reduction step by hydrogen, so the vanadium compound can be used in this step without any previous removal treatment.

The polyvanadate compound obtained in the purification step is heated under a reductive gas atmosphere, preferably a hydrogen gas atmosphere. As the most suitable embodiment, the compound is previously reduced at a temperature range of 500° to 690° C. and is completely reduced at a temperature over 690° C. Because this pre-reduction increases the melting point of the compound due to the reduction of the $V_2O_5$ surface to trivalent vanadium compound, the compound does not adhere to the reactor during the full-scale reduction carried out even in a temperature range over the melting point of $V_2O_5$.

Therefore, after such a pre-reduction, full-scale reduction can be carried out at a high temperature over 1,000° C. by using carbon monoxide, a hydrogen-carbon monoxide mixture, a mixture of carbon powder and air or oxygen as a reductant. The use of carbon monoxide and carbon powder as the reductant allows an increase in reaction temperature by their combustion in the reduction furnace.

In such a way, a high purity trivalent vanadium compound not containing ammonia can be obtained.

(5) Trivalent vanadium ($V^{3+}$) electrolytic solution forming step:

The trivalent vanadium compound, $V_2O_3$ is a black solid and stable enough to be stored in air. $V_2O_3$ is dissolved in sulfuric acid at atmospheric pressure or elevated pressures at a temperature range of 60° to 150° C. to prepare the trivalent vanadium electrolytic solution.

(6) Trivalent and tetravalent vanadium ($V^{3+}/V^{4+}$) mixed electrolytic solution forming step:

Because the mixed solution of the trivalent vanadium and the tetravalent vanadium can be used as the electrolytic solution of vanadium batteries, the trivalent and tetravalent vanadium mixed electrolytic solution can be prepared by adding the high purity $V_2O_5$ obtained in the de-ammoniation step into the trivalent vanadium electrolytic solution in order to form the tetravalent vanadium compound as follows:

$$V_2(SO_4)_3+V_2O_5+H_2SO_4=4VOSO_4+H_2O$$

This reaction can easily proceed at room temperature, and it is convenient for continuous production.

As the method of the present invention is applicable to both batch and continuous production, high purity vanadium pentoxide and vanadium trioxide can be easily produced and stored according to demand. Thus, the method is very economical due to the minimized investment required for acid resistant electrolytic solution storage tanks, etc.

With the method of the present invention, an electrolytic solution of high purity trivalent and tetravalent vanadium compounds and their mixtures can be appropriately and easily produced from low purity vanadium raw materials which are inexpensive and can be steadily supplied.

EXAMPLES

The present invention will be specifically described with reference to the following examples.

EXAMPLE 1

Into a 5 liter three-neck flask were put 5 liters of pure water and 150 g (1.282 mol) of recovered ammonium metavanadate made by Kashima-Kita Electric Power Corporation, and the solution in the flask was stirred at 80° C. After complete dissolution, 60 ml of concentrated sulfuric acid was gradually added to the solution until the pH of the solution decreased to around 2, and vigorously stirred for one hour to complete the polymerization. The reddish brown polyvanadate compound formation will start immediately after the addition of the acid. The resulting crystal solid was washed with pure water by suction filtration, then dried at 110° C. The yield was 120 g. The analytical results of the obtained polyvanadate compound are shown in Table 1 with the those of a reagent grade $V_2O_5$. Table 1 demonstrates that the parities of the polyvanadate compound obtained from this example is higher than those of the reagent grade $V_2O_5$ except for the ammonium ion content.

TABLE 1

| | Results of analysis of raw material and vanadium compounds after purifying | | |
|---|---|---|---|
| Impurities | Raw material $NH_4VO_3$ (wt. ppm) | V compound after purifying (wt. ppm) | Reagent special grade $V_2O_3$ (wt. ppm) |
| Na | 70 | <10 | <10 |
| K | trace | trace | <10 |
| Fe | trace | trace | 19 |
| Ca | 330 | <10 | <10 |
| Mg | 80 | <10 | <10 |
| Si | 2200 | 11 | 71 |
| Ni | 90 | <10 | <10 |
| $NH_4$ | 15.4% | 5% | <200 |

The polyvanadate compound was heated at 500° C. for 4 hours to convert to $V_2O_5$ by removing ammonium ions and water. Then, 51 g of the polyvanadate compound was suspended in 500 ml of 4M sulfuric acid solution, and 63 g of oxalic acid was added into the suspension. The suspension was allowed to perform the reduction at 105° C. for 4 hours, and the tetravalent vanadium electrolytic solution was prepared. The analytical results of the tetravalent vanadium electrolytic solution is shown in Table 2.

TABLE 2

| Properties of tetravalent electrolyte | | | |
|---|---|---|---|
| $V^{4+}$ mol/l | $V^{5+}$ mol/l | $SO_4^{2-}$ mol/l | Total organic compound ppm |
| 2.06 | 0 | 4 | 940 |

EXAMPLE 2

Into an electric reduction furnace was put 60 g of the polyvanadate compound purified in EXAMPLE 1, and reduced with hydrogen flowing at 1 liter/min at 600° C. for 4 hours. Black $V_2O_3$ was obtained as the reduced product. The weight of the product was 47 g. Next, 45 g (0.5 mol) of $V_2O_3$ was put into 150 ml of 4M sulfuric acid solution and completely dissolved at 105° C. for 6 hours in the nitrogen atmosphere. After dissolving, water was added to the solution in order to prepare 2M trivalent vanadium electrolytic solution. The analytical results of the obtained trivalent vanadium electrolytic solution is shown in Table 3. It was confirmed that the solution was a trivalent vanadium solution by its UV spectrum.

TABLE 3

| Properties of trivalent electrolyte | | | |
|---|---|---|---|
| $V^{3+}$ mol/l | $V^{4+}$ mol/l | $SO_4^{2-}$ mol/l | $V^{3+}$ content % |
| 1.95 | 0.05 | 4 | 97.42 |

EXAMPLE 3

A procedure similar to EXAMPLE 1 was carried out except that the quantity of the recovered metavanadate compound was increased to 200 g. The polyvanadate compound after sulfuric acid addition was isolated by filtration, put into a airtight box furnace, and heated at 600° C. for 2 hours in a nitrogen gas flow. One fourth of the resulting vanadium compound was taken out from the furnace. The analytical results of the impurities are shown in Table 4.

TABLE 4

| Results of analysis of vanadium compounds after calcining | | |
|---|---|---|
| Impurities | V compound after calcining (wt. ppm) | Reagent special grade $V_2O_5$ (wt. ppm) |
| Na | <10 | <10 |
| K | trace | <10 |
| Fe | trace | 19 |
| Ca | <10 | <10 |
| Mg | <10 | <10 |
| Si | 21 | 71 |
| Ni | <10 | <10 |
| $NH_4$ | 40 | <200 |

The remaining vanadium compound was reduced at 600° C. for 4 hours in the hydrogen gas atmosphere. The ammonium ion content of the obtained black $V_2O_3$ was less than 40 ppm. A 1.5M trivalent vanadium electrolytic solution was prepared by dissolving 112 g (0.75 mol) of the $V_2O_3$ into 1,000 ml of 4M sulfuric acid solution at 105° C. Approximately 45 g (0.25 mol) of the $V_2O_5$ which had been partially taken out from the furnace was added to the trivalent vanadium electrolytic solution at room temperature. The analytical results of the resulting electrolytic solution are shown in Table 5.

TABLE 5

| Properties of tri- and tetra-valent mixed electrolyte | | | |
|---|---|---|---|
| $V^{3+}$ mol/l | $V^{4+}$ mol/l | $SO_4^{2-}$ mol/l | Total vanadium mol/l |
| 1.0 | 1.0 | 4 | 2.0 |

What is claimed is:

1. A method for producing an electrolytic solution containing vanadium as positive and negative electrode active materials, said method comprising:
   (1) purifying a vanadium compound selected from the group consisting of vanadium pentoxide and ammonium metavanadate by:
      dissolving a crude mixture containing said vanadium compound and impurities in a solvent under an alkaline or neutral condition,
      precipitating said polyvanadate compound by thermal polymerization of vanadium ions under an acidic condition, and
      isolating said polyvanadate compound from the solution containing impurities;
   (2) baking part of said pure polyvanadate compound at a temperature range of 400° to 690° C. in an inert or oxidizing gas atmosphere so as to remove ammonium ions;
   (3) treating another part of said polyvanadate compound under a reductive atmosphere to form a trivalent vanadium compound is formed;
   (4) dissolving said trivalent vanadium compound in an acid solution to form a $V^{3+}$ electrolytic solution; and
   (5) mixing said vanadium pentoxide and said $V^{3+}$ electrolytic solution to form a $V^{4+}/V^{3+}$ mixed electrolytic solution.

2. The method of claim 1, wherein, in step (1), said solvent is water and said impurities are water soluble metal salts, silicates, colloidal silica or mixtures thereof.

3. The method of claim 2, wherein following step (1) the quantity of silicates or colloidal silica remaining is 1,000 ppm or less of ion concentration.

4. The method of claim 1, wherein, in step (1), said acid is sulfuric acid and said alkali is ammonia.

5. The method of claim 1, wherein, in step (3), said reductive atmosphere is hydrogen, carbon monoxide or a mixture thereof or is a combination of carbon powder and air or oxygen.

6. A method for producing an electrolytic solution containing vanadium as positive and negative electrode active materials, said method comprising:
   (1) purifying a vanadium compound selected from the group of vanadium pentoxide and ammonium metavanadate by:
      dissolving a mixture of said vanadium compound and impurities in a solvent under an alkaline or neutral condition,
      precipitating said polyvanadate compound by thermal polymerization of vanadium ions under an acidic condition, and
      isolating said polyvanadate compound from the solution containing impurities;
   (2) baking a part of said polyvanadate compound prepared in step (1) at a temperature range of 400° to 690° C. in an inert or oxidizing gas atmosphere so as to remove ammonium ions;

(3) suspending said vanadium pentoxide formed in step (2) in a solvent and heating with a reductant to form a tetravalent vanadium compound;

(4) treating another part of said polyvanadate compound prepared in step (1) under a reductive atmosphere to form a trivalent vanadium compound; and (5) dissolving said tetravalent vanadium compound into an acid solution to form a $V^{3+}$ electrolytic solution.

7. The method of claim 6, wherein said method further comprises:

(6) mixing said vanadium pentoxide and said trivalent vanadium compound to form a $V^{4+}/V^{3+}$ mixed electrolytic solution.

8. The method of claim 6, wherein, in step (1), said solvent is water and said impurities are water soluble metal salts, silicates, colloidal silica, or mixtures thereof.

9. The method of claim 6, wherein said acid in step (1) is sulfuric acid and the alkali is ammonia.

10. The method of claim 6, wherein following step (1) the quantity of silicates or colloidal silica remaining is 1,000 ppm or less of ion concentration.

11. The method of claim 6, wherein said reductive atmosphere is hydrogen, carbon monoxide, a mixture thereof or is a combination of carbon powder and air or oxygen.

12. The method of claim 6, wherein, in step (3), said reductant is oxalic acid.

* * * * *